United States Patent
Vargas et al.

(10) Patent No.: US 12,309,198 B2
(45) Date of Patent: May 20, 2025

(54) COMPUTER SOFTWARE IMPLEMENTED CYBERSECURITY FOR MATRIX BARCODE INTERACTION WITH SMART DEVICE

(71) Applicant: INTERNATIONAL BUSINESS MACHINES CORPORATION, Armonk, NY (US)

(72) Inventors: Juan F. Vargas, Cary, NC (US); Mark E. Maresh, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 18/114,577

(22) Filed: Feb. 27, 2023

(65) Prior Publication Data
US 2024/0291861 A1    Aug. 29, 2024

(51) Int. Cl.
H04L 9/40   (2022.01)
G06K 19/06   (2006.01)

(52) U.S. Cl.
CPC .... *H04L 63/1483* (2013.01); *G06K 19/06037* (2013.01)

(58) Field of Classification Search
CPC ...................... H04L 63/1483; G06K 19/06037
See application file for complete search history.

(56) References Cited

U.S. PATENT DOCUMENTS

| | | | |
|---|---|---|---|
| 7,698,442 B1 * | 4/2010 | Krishnamurthy | G06F 21/51 709/229 |
| 8,364,397 B2 | 1/2013 | Hamilton, II | |
| 8,827,160 B1 | 9/2014 | Pascal | |
| 8,997,241 B2 | 3/2015 | Terwilliger | |
| 9,179,316 B2 | 11/2015 | Raleigh | |
| 9,306,944 B2 | 4/2016 | Terwilliger | |
| 9,462,210 B2 | 10/2016 | Dagit, III | |
| 9,674,188 B2 | 6/2017 | Sabin | |
| 9,826,049 B2 * | 11/2017 | Lim | G06F 16/9558 |

(Continued)

FOREIGN PATENT DOCUMENTS

WO    2013057540 A1    4/2013

OTHER PUBLICATIONS

Connectcode, "QR Code Barcode", Copyright © 2009-2021, ConnectCode, 49 pages, <https://www.barcoderesource.com/qrcodebarcode.shtml>.

(Continued)

*Primary Examiner* — Kambiz Zand
*Assistant Examiner* — Afaq Ali
(74) *Attorney, Agent, or Firm* — Michael A. Petrocelli

(57) ABSTRACT

Cybersecurity is provided for a transaction initiated by a matrix barcode using a smart device connected to a computer network by a device having a computer receiving a reading of a matrix barcode on an item. The matrix barcode electronically pointing to a URL (Uniform Resource Locator) for a web-based resource accessible using the device via a computer network. Using the computer of the device or a service computer, determining information parameters about the matrix barcode, and determining when the URL is identified as a registered service provider in a knowledge corpus communicating with the service computer. The URL can be validated as registered, when the URL is identified as corresponding to the registered service provider and based on the information parameters.

20 Claims, 6 Drawing Sheets

(56) References Cited

U.S. PATENT DOCUMENTS

| | | | |
|---|---|---|---|
| 10,440,014 | B1 | 10/2019 | Hoyer |
| 10,635,792 | B2 | 4/2020 | Dudley |
| 11,107,071 | B2 | 8/2021 | Carlsson |
| 11,301,576 | B2* | 4/2022 | Heeter ............... G06F 21/6218 |
| 2014/0022281 | A1 | 1/2014 | Georgeson |
| 2015/0178721 | A1 | 6/2015 | Pandiarajan |
| 2016/0196484 | A1* | 7/2016 | Ciavatta ........... G06K 19/06037 |
| | | | 235/462.1 |
| 2018/0248878 | A1* | 8/2018 | El-Moussa .......... G06F 16/9554 |
| 2022/0147966 | A1* | 5/2022 | Babcock ............. G06Q 20/405 |
| 2023/0065676 | A1* | 3/2023 | Obstfeld ................ H04L 67/12 |
| 2023/0262079 | A1* | 8/2023 | Feldbau ............... H04L 63/101 |
| | | | 726/4 |

OTHER PUBLICATIONS

Disclosed Anonymously, "Incremental sharing using machine learning", An IP.com Prior Art Database Technical Disclosure, IP.com No. IPCOM000252683D, IP.com Electronic Publication Date: Feb. 1, 2018, 33 pages.

Disclosed Anonymously, "Method to associate URL with list of users for streamlined follow and synchronization", An IP.com Prior Art Database Technical Disclosure, IP.com No. IPCOM000232213D, IP.com Electronic Publication Date: Oct. 27, 2013, 4 pages.

Disclosed Anonymously, "System and Method of QR code Preview", An IP.com Prior Art Database Technical Disclosure, IP.com No. IPCOM000229583D, IP.com Electronic Publication Date: Aug. 6, 2013, 5 pages.

Eddy, "Norton Security and Antivirus (for Android) Review", PC Magazine, Updated Sep. 22, 2015, 17 pages, <https://www.pcmag.com/reviews/norton-security-and-antivirus-for-android>.

Lerner et al., "Analyzing the Use of Quick Response Codes in the Wild", MobiSys '15: Proceedings of the 13th Annual International Conference on Mobile Systems, Applications, and Services, May 2015, pp. 359-374, <https://dl.acm.org/doi/abs/10.1145/2742647.2742650>.

Maury, "QR Codes: A Growing Security Problem", eSecurityPlanet, Feb. 21, 2022, 6 pages, <https://www.esecurityplanet.com/threats/qr-code-security-problem/#:~:text=While%20this%20makes%20logging%20in,to%20a%20phishing%20page%2C%20allowing>.

O'Donnell, "Why You Need to Protect Yourself From Malicious QR Codes", Lifewire, Updated on Sep. 30, 2022, 3 pages, <https://www.lifewire.com/how-to-protect-yourself-from-malicious-qr-codes-2487772>.

QRPLANET, "QR Code GPS Tracking", accessed on Feb. 24, 2023, 5 pages, https://qrplanet.com/tracking-qr-code-html5-geolocation.

Rajput, "7 best QR Code scanner apps for Android and iOS leading the pack in 2022", beaconstac, Last Updated: Sep. 21, 2022, 17 pages, <https://blog.beaconstac.com/2019/09/best-qr-code-scanner-apps/>.

Symantec Corporation, "Encrypted Data Matrix or Quick Response Code Panel for Accessing Device States and Settings from Mobile Devices", An IP.com Prior Art Database Technical Disclosure, IP.com No. IPCOM000209996D, IP.com Electronic Publication Date: Aug. 19, 2011, © 2010, 2011Symantec Corporation, 4 pages.

Unknown, "GPS Tracking QR Codes with HTML5 Geolocation", qrd°by, last retrieved from internet Oct. 13, 2022, 3 pages, <https://qrd.by/tracking-qr-code-html5-geolocation>.

Unknown, "Learn the Basics of GPS Tracking Using QR Codes, RFID, and Bluetooth Low Energy", Go Codes, last retrieved from internet Oct. 13, 2022, 3 pages, <https://gocodes.com/learn-the-basics-of-gps-tracking-using-qr-codes-rfid-and-bluetooth-low-energy/#:~:text=QR%20codes%20work%20very%20well,%2C%20and%20much%2C%20much%20more>.

Waqas, "Risks of Using QRCodes and How to Mitigate it—Not as Safe as You Think", IEEE Computer Society, Oct. 19, 2021, 5 pages, <https://www.computer.org/publications/tech-news/trends/qr-code-risks>.

Kaspersky Lab Switzerland, "QR Code Reader and Scanner", Free App, Updated on Oct. 4, 2022, 4 pages.

\* cited by examiner

COMPUTER SOFTWARE IMPLEMENTED CYBERSECURITY FOR MATRIX BARCODE INTERACTION WITH SMART DEVICE

BACKGROUND

The present disclosure relates to providing security, using computer software, for matrix barcode interaction with a smart device or mobile device.

In one example, financial transactions can occur via physical interaction between a provider of services and their customers. However, technology has enabled online transactions which are open to unauthorized transaction threats. In one example, a provider can use a matrix barcode, such as a QR (Quick Response) barcodes or a QR Code® to guide customers to land on specific websites by linking to a Uniform Resource Locator (URL), for example, to capture payments. A matrix barcode is a machine-readable optical label that can contain information about an item to which it is attached. In one example, a matrix barcode can point to a website or software application, and is typically scanned or captured using the camera of a mobile device or smart device (or smart phone). Such a system using a matric barcode enables readability and storage capacity. A system can include scanning or reading an item using a smart device for identification, and automatic direction to a website or software application using the smart device by connection to a computer network such as the Internet.

In one example, an unauthorized access to a transaction between a smart device and a network hosted resource can occur by using a redirection of the smart device to an unauthorized resource. For example, a payment operation can include posting a matrix barcode over a legitimate matrix barcode to mislead a customer and gain unauthorized access to transactions.

SUMMARY

The present disclosure recognizes the shortcomings and problems associated with current techniques for providing security for a transaction initiated by a matrix barcode using a smart device.

Embodiments of the present disclosure provide a secure method to determine when a customer can safely navigate, or identify a legitimate URL to navigate to, using an embedded URL accessible using a matrix barcode. Embodiments of the present disclosure present a method in which a device scans a matrix barcode and determines location coordinates of the reading to communicate this information to a service where registration is present confirming a legitimate provider doing business. Based on the service findings, a client code or other communication on the user device can alert and/or block a user from accessing a URL. And when the URL is untrusted or unregistered, the method can block access to the URL to avoid unauthorized access.

In an aspect according to the present invention, a computer-implemented method for providing cybersecurity for a transaction initiated by a matrix barcode using smart device connected to a computer network includes receiving, at a device having a computer, a reading of a matrix barcode on an item, the matrix barcode electronically pointing to a URL (Uniform Resource Locator) for a web-based resource accessible using the device via a computer network. The method includes determining, using the computer of the device or a service computer, information parameters about the matrix barcode. The method includes determining, using the computer of the device or the service computer, when the URL is identified as a registered service provider in a knowledge corpus communicating with the service computer. The method includes validating the URL as registered, using the computer of the device or the service computer, when the URL is identified as corresponding to the registered service provider and based on the information parameters.

In a related aspect, the method can further include, in response to the validation of the URL as registered, sending a notification to the device for communication to a user that the URL is valid.

In a related aspect, the method can further include identifying the URL including the service provider providing the URL, and determining, using geo-positioning, a location of the reading using the device, the location being an information parameter of the information parameters.

In a related aspect, the method can further include allowing or blocking access to the URL on the device based on the validation of the URL.

In a related aspect, the method further includes allowing access to the URL using the device when the URL is validated as registered.

In a related aspect, the method includes determining an owner of the URL by determining ownership of a website of an entity corresponding to the URL.

In a related aspect, the method further includes using a knowledge corpus communicating with the computer of the device in the determining when the matrix barcode is identified as being a registered matrix barcode with a registered service provider in the knowledge corpus.

In a related aspect, the reading of the barcode includes scanning the barcode using an optical device of the device.

In a related aspect, the matrix barcode is a two-dimensional barcode.

In a related aspect, the method further including receiving service provider data from each of a plurality of service providers, the service providers providing URLs, respectively, for accessing websites electronically using a computer network by the device.

In a related aspect, the URLs point to websites corresponding to each of the service providers, respectively.

In a related aspect, the method further including storing the service provider data in the knowledge corpus.

In a related aspect, the web based resource is a website.

In another aspect according to the present invention, a system for providing cybersecurity for a transaction initiated by a matrix barcode using a smart device connected to a computer network includes a computer system. The computer system comprising; a computer processor, a computer-readable storage medium, and program instructions stored on the computer-readable storage medium being executable by the processor, to cause the computer system to perform the following functions to; receive, at a device having a computer, a reading of a matrix barcode on an item, the matrix barcode electronically pointing to a URL (Uniform Resource Locator) for a web-based resource accessible using the device via a computer network; determine, using the computer of the device or a service computer, information parameters about the matrix barcode; determine, using the computer of the device or the service computer, when the URL is identified as a registered service provider in a knowledge corpus communicating with the service computer; and validate the URL as registered, using the computer of the device or the service computer, when the URL is identified as corresponding to the registered service provider and based on the information parameters.

In a related aspect, the system further includes, in response to the validation of the URL as registered, sending a notification to the device for communication to a user that the URL is valid.

In a related aspect, the system further includes identifying the URL including the service provider providing the URL, and determining, using geo-positioning, a location of the reading using the device, the location being an information parameter of the information parameters.

In a related aspect, the system further includes allowing or blocking access to the URL on the device based on the validation of the URL.

In a related aspect, the system further includes allowing access to the URL using the device when the URL is validated as registered.

In a related aspect, the system further includes determining an owner of the URL by determining ownership of a website of an entity corresponding to the URL.

In another aspect according to the present invention, a computer program product for providing cybersecurity for a transaction initiated by a matrix barcode using a smart device connected to a computer network includes the computer program product comprising a computer readable storage medium having program instructions embodied therewith. The program instructions are executable by a computer to cause the computer to perform functions, by the computer, comprising the functions to; receive, at a device having a computer, a reading of a matrix barcode on an item, the matrix barcode electronically pointing to a URL (Uniform Resource Locator) for a web-based resource accessible using the device via a computer network; determine, using the computer of the device or a service computer, information parameters about the matrix barcode; determine, using the computer of the device or the service computer, when the URL is identified as a registered service provider in a knowledge corpus communicating with the service computer; and validate the URL as registered, using the computer of the device or the service computer, when the URL is identified as corresponding to the registered service provider and based on the information parameters.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1A:
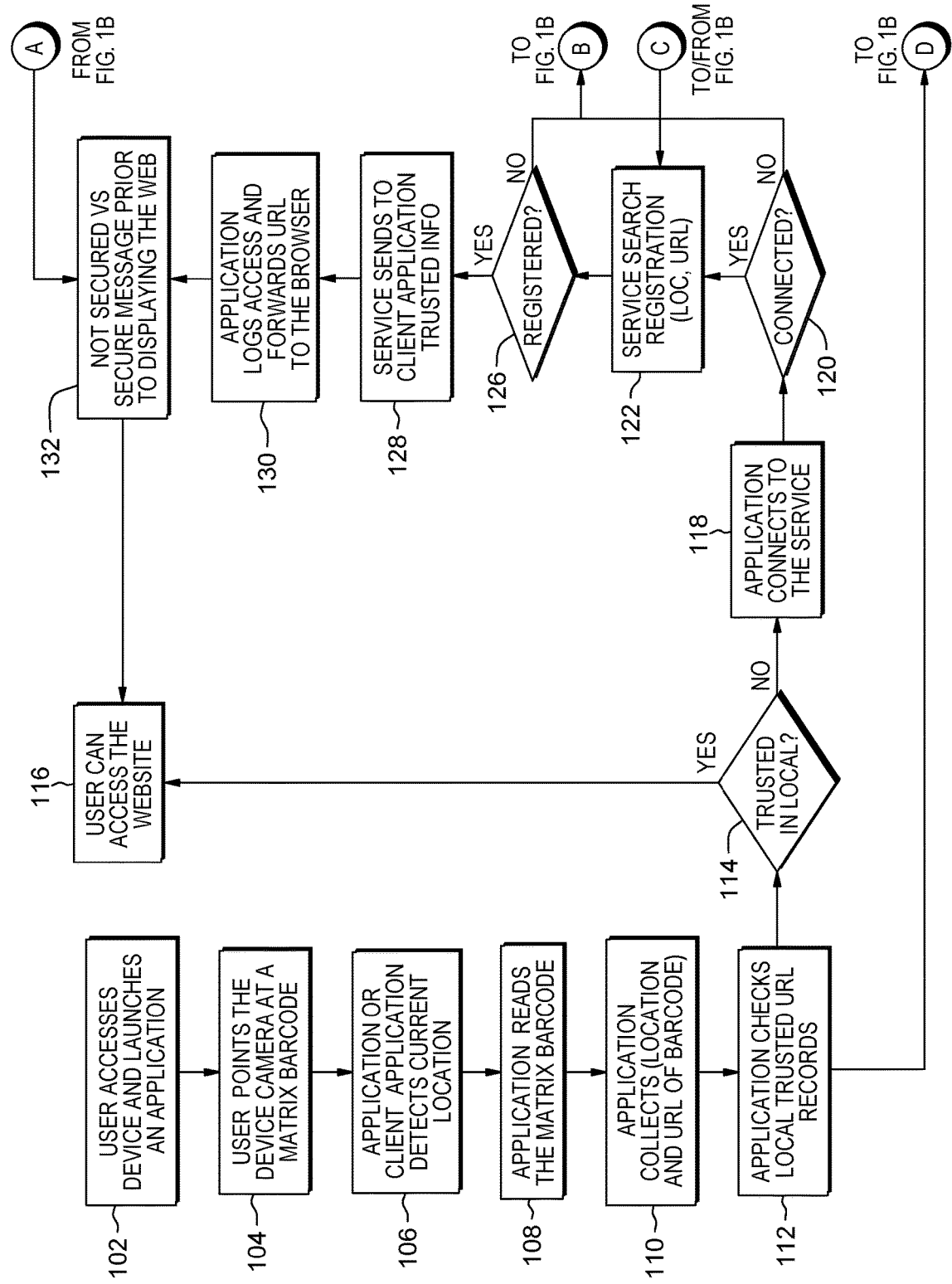
FIG. 1A is a schematic block diagram illustrating a system according to an embodiment of the present disclosure, for providing cybersecurity for a transaction initiated by a matrix barcode using a smart device connected to a computer network.

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

EMBODIMENTS AND EXAMPLES

Embodiments and figures of the present disclosure may have the same or similar components as other embodiments. Such figures and descriptions illustrate and explain further examples and embodiments according to the present disclosure. Embodiments of the present disclosure can include operational actions and/or procedures. A method, such as a computer-implemented method, can include a series of operational blocks for implementing an embodiment according to the present disclosure which can include cooperation with one or more systems shown in the figures. The operational blocks of the methods and systems according to the present disclosure can include techniques, mechanism, modules, and the like for implementing the functions of the operations in accordance with the present disclosure. Similar components may have the same reference numerals. Components can operate in concert with a computer implemented method.

It is understood that a customer can be an individual, or a group of individuals, or a company or an organization.

Figure 1B:
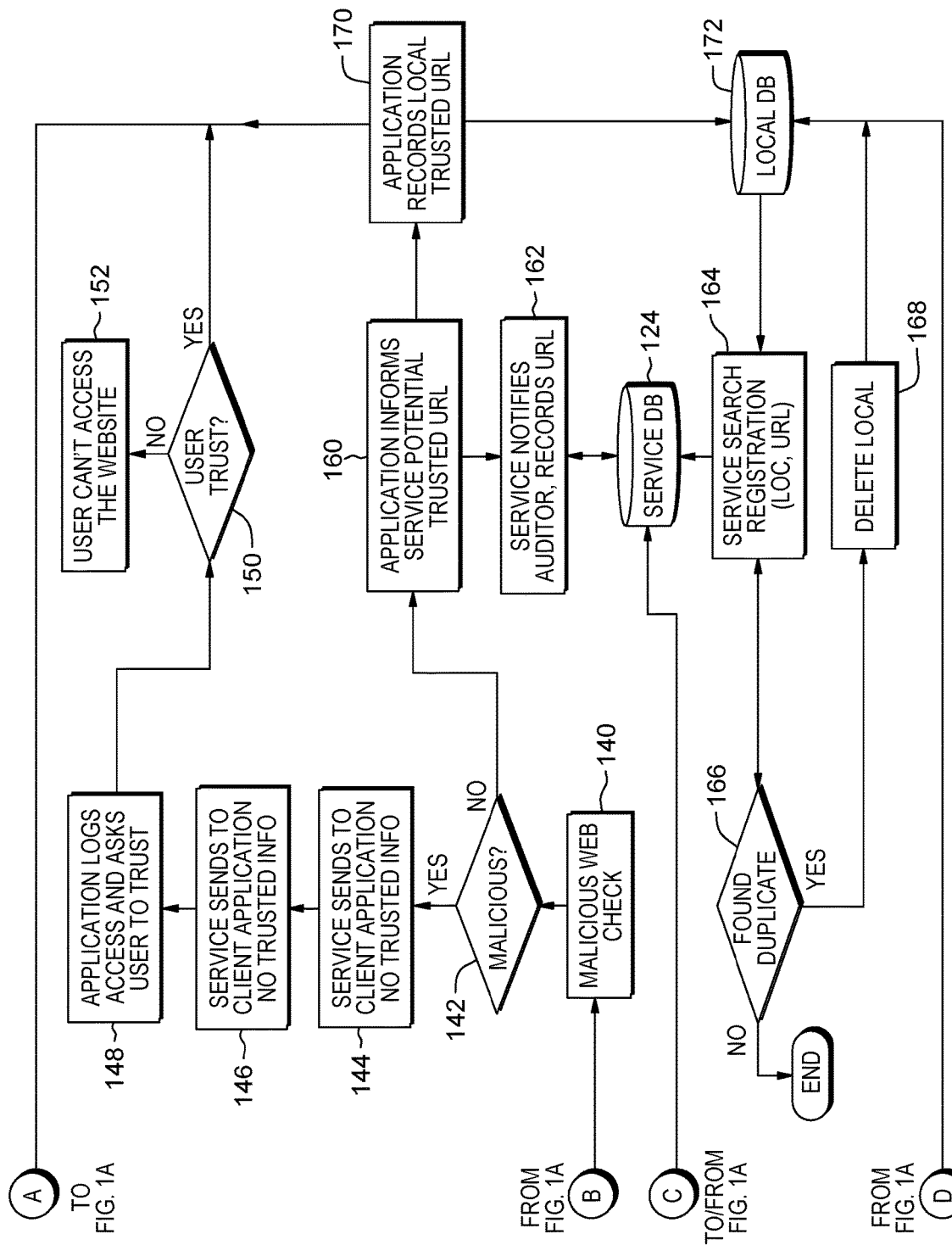
FIG. 1B is a continuation of the system shown in 1A.

Referring to FIGS. 1A and 1B, according to an embodiment of the present disclosure, a computer implemented method 100 can provide cybersecurity for a transaction initiated by a matrix barcode using smart device connected to a computer network.

Figure 2:
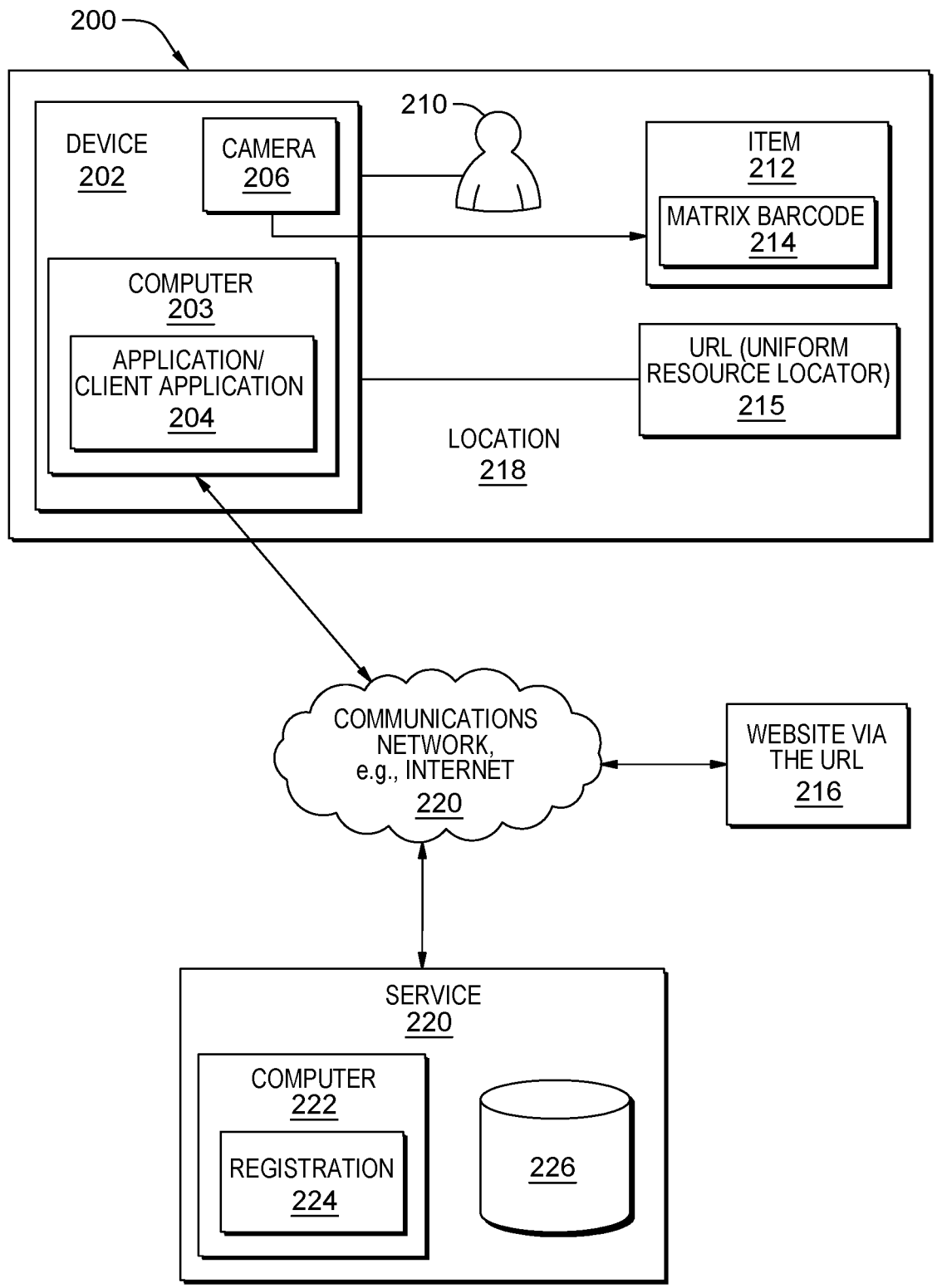
FIG. 2 is a schematic block diagram of a system, according to another embodiment of the present disclosure, for providing cybersecurity for a transaction initiated by a matrix barcode using a smart device connected to a computer network, and can interact with the system shown in FIGS. 1A and 1B.

Referring to FIG. 2, in one embodiment, a system 200 can be used to implement the method 100. The method 100 includes a device such as a mobile device 202 including an application or client application 204 receiving an operative instruction to launch the application, as in block 102. The device is used to capture a matrix barcode 214 on an item 212 using a camera 206 in the device 202, as in block 104. The application 204 detects location data such as a current location 218 of the device, at block 106. The application reads the matrix barcode 214, at block 108. The application collects the current location 218, and a URL (Uniform Resource Locator) 216 associated with the matrix barcode 214, as in block 110. The application checks for a local trusted URL (Uniform Resource Locator), in block 112. A local trusted URL can be a URL known to the application without checking or accessing a network computer or server via a wide area network (WAN).

The method includes determining if the URL 216 is a trusted URL at block 114. When the URL is trusted, the method proceeds to allow the URL to be accessed via the device by the user 210, as in block 116. When the URL is determined to not be trusted in block 114, the method proceeds to connect to a service 220, for example via a communications network 219 such as a WAN, as in block 118. The service 220 includes a computer 222 having computer readable storage medium 226. The service can also store data using the computer 222. The data can include customer or user information, and URL information for use in determining when a URL is trusted.

The method 100 determines when the device is connected to the service 220 at block 120. When connected to the service, the service searches registrations 224 saved in a database 226, at block 122. The method 100 proceeds to determine when a URL is registered at block 126, and when a registration for the URL is found to be registered, the method proceeds to the service sending to the client application 204 the trusted information, at block 128.

The method includes the application logging access to the URL and forwarding the URL to a browser on the device, in block 130. The method includes the application displaying a secure message prior to displaying the browser access at block 132, and the method enables or allows the user to access a website initiated by the URL, at block 116.

When the method does not connect to the service at block 120, and alternatively, when the URL is found to be not registered at block 126, the method proceeds to a malicious web check at block 140. The method determines if the web access is malicious at block 142. If the access is malicious, then the method proceeds to the service sending to the client application that the information is not trusted, at block 144. The method includes the service sending to the client application that no trusted information is available, as in block 146. The application logs the attempted access of the URL and can further inquire of the user via the user device if the user trusts the URL, as in block 148. If the user trusts the URL in block 150, the method proceeds to allow access of the website in block 116. If the user does not trust, the method blocks access to the website pointed to by the URL, as in block 152.

Returning to block 142, when the method determines the URL is not malicious, the method proceeds to the application informing the service of a potential trusted URL at block 160. The application records locally the URL as a trusted URL at block 170 which can be stored in a local database 172. The database 172 communicates with the service search registration 164, which can be recorded in a service database 124. The method can determine if a duplicate URL is found in the local database at block 166 and if so, delete the local record of the duplicate URL at block 168.

Further at block 162, the method notifies a service auditor of the potential trusted URL and records the URL at block 162. The recording can be implemented at the service database 124.

According to embodiment of the present disclosure, a method can use a GPS (Global Positioning System) location and URL, registered by a service, as verification for a URL and a corresponding matrix barcode. A service can determine a valid registration or verify a URL and can notify a user, for example, with a client code, to proceed to open a URL. A service can warn, e.g., with a client code, of an unknown matrix barcode and/or can display a URL to a user for verification before opening it. In another example, a service can warn a user that a website corresponding to a URL is no secure or verified, e.g., not registered with the service. In another example, a user can set an exception list for URLs. In another example, a service can detect a new data feed of a new URL and GEO (geographic) coordinates and inform a service team of a potential trusted website that could be verified. Thereby, by using geolocation, determined by the device, and the URL embedded in the matrix barcode, a method of the present disclosure can verify and warn a user if the corresponding link or URL via the matrix barcode is valid, e.g., verified, which can include a level of safety, to access.

Other Embodiments and Examples

Figure 3:
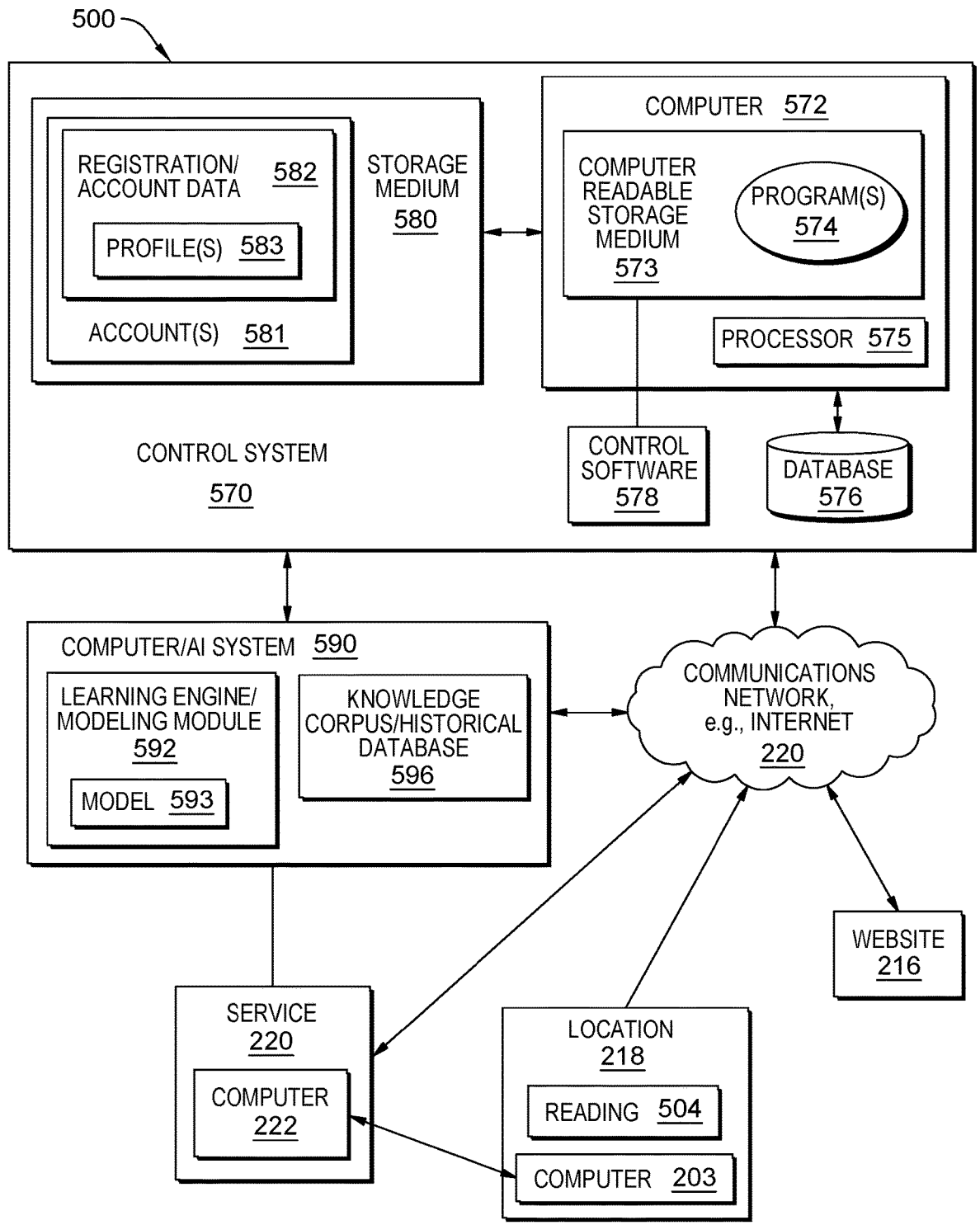
FIG. 3 is a schematic block diagram of a system, according to another embodiment of the present disclosure, providing cybersecurity for a transaction initiated by a matrix barcode using a smart device connected to a computer network.
Figure 4:
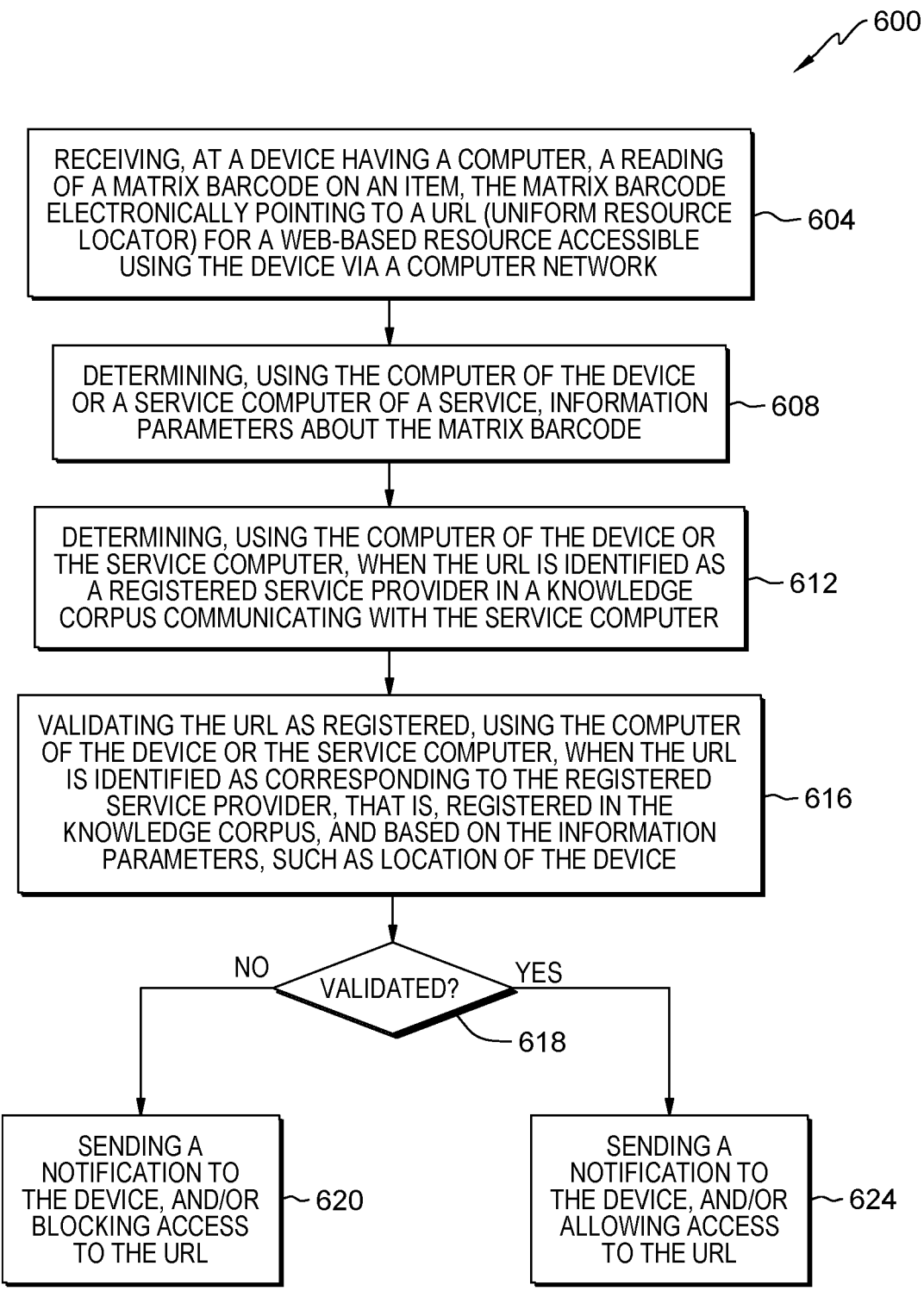
FIG. 4 is a flow chart illustrating a method according to an embodiment of the present disclosure which can use the system depicted in FIG. 3, for providing cybersecurity for a transaction initiated by a matrix barcode using a smart device connected to a computer network.

Referring to FIGS. 3 and 4, according to an embodiment of the present disclosure, a computer implemented method 600 in FIG. 4 can provide cybersecurity for a transaction initiated by a matrix barcode using smart device connected to a computer network. Further, in one embodiment, a system 500 shown in FIG. 3, can be used to implement the method 600. The system 500 includes the system 200 shown in FIG. 2 and further includes the computer 222 and/or the computer 203 of the device 202 communicating with a control system 570 via the network 219.

The method 600 includes receiving, at a device 202 having a computer 203, a reading 504 of a matrix barcode 214 on an item 212, as in block 604. The matrix barcode 214 electronically pointing to a URL (Uniform Resource Locator) 215 for a web-based resource such as a website 216 accessible using the device 202 via a computer network 219. The method includes determining, using the computer of the device or a service computer 222 of a service 220, information parameters about the matrix barcode 214, as in block 608. The information parameters can include a location of the device and determining origin or ownership of the URL.

The method includes determining, using the computer of the device or the service computer, when the URL is identified as a registered service provider registered 224 in a knowledge corpus communicating with the service computer 222, as in block 612. The method includes validating the URL as registered, using the computer of the device or the service computer, when the URL is identified as corresponding to the registered service provider, that is, registered 224 in the knowledge corpus, and based on the information parameters, such as location of the device, as in block 616.

In one example, the method can include in response to the validation of the URL, as registered (as in block 618), that is being found or verified as a URL registered as a registered URL in the knowledge database, sending a notification to the device, as in block 624. The notification is for communication to a user that the URL is valid. Such a notification can include one or more electronic communications such as a text message or an audible communication.

The method further includes identifying the URL including the service provider providing the URL, and determining, using geo-positioning (i.e., a Global Satellite-based Navigation System), a location of the reading using the device. The identification can include determining an ownership of the URL. The location is part of the information parameters.

The method can further include allowing or blocking access to the URL on the device based on the validation of the URL, as in block 620 and in block 624. In one example, when the URL is determined to not be registered (in block 618), or validated by checking for a registration and in this example, not registered, the method can block the URL on the users device or require the user to allow navigation to the URL, as in block 620.

The method can further include allowing access to the URL using the device when the URL is validated as registered.

In one example, determining an owner of the URL can be implemented by determining ownership of a website of an entity corresponding to the URL.

In one example, the method further includes using a knowledge corpus communicating with the computer of the device to determine when the matrix barcode is identified as being a registered matrix barcode with a registered service provider in the knowledge corpus. For instance, a registered service provider can be a service provider which is verified as providing a URL and listed in a registered service provider list.

The reading of the barcode can include scanning the barcode using an optical device of the device. Further, the matrix barcode can be a two-dimensional barcode. In one example, the method can include receiving service provider data from each of a plurality of service providers, and the service providers providing URLs, respectively, for accessing websites electronically using a computer network by the device.

The method can include the URLs pointing to websites corresponding to each of the service providers, respectively. In one example, the service provider data can be stored in the knowledge corpus. In one example, a web-based resource can be a website hosted by a web service.

Thereby, according to the embodiments of the present disclosure, a method for validating a URL (Uniform Resource Locator) by analyzing a quick response code (e.g., QR Code®), or matrix barcode, or other two-dimensional barcode can include receiving, at a computer, a scan of a barcode on an item, and the barcode electronically pointing to a URL accessible on a mobile device. The method includes determining a location of the scan, and determining, using a knowledge corpus comminating with the computer, when the barcode is registered to a registered business to validate the barcode and corresponding URL. The validating further including confirming the location of the scan with the geo-location of the device to further verify the validity of the scan and registration. In one example, a location is part of the registration and can include one or more of a geographic location, a City or a State, a Province, etc. The location from the geo-location can be confirmed as part of verification, to match the location that is saved in the registration to verify authenticity of the scan. In response to the validation, the method includes sending a notification to the mobile device for display to notify the user viewing the mobile device about the validity of the URL. Further, the method can include allowing or blocking access to the URL on the device based on the validation of the URL.

Other Examples and Embodiments

In other embodiments and examples, in the present disclosure shown in the figures, a computer can be part of a remote computer or a remote server, for example, a remote server. In another example, the computer can be part of a control system and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs. A device(s), for example a mobile device or mobile phone, can belong to one or more users, and can be in communication with the control system via the communications network.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device can include a computer having a processor and a storage medium which stores an application, and the computer includes a display. The application can incorporate program instructions for executing the features of the present disclosure using the processor. In another example, the mobile device application or computer software can have program instructions executable for a front end of a software application incorporating the features of the method of the present disclosure in program instructions, while a back end program or programs, of the software application, stored on the computer of the control system communicates with the mobile device computer and executes other features of the method. The control system and the device (e.g., mobile device or computer) can communicate using a communications network, for example, the Internet.

It is understood that the user device is representative of similar devices which can be for other users, as representative of such devices, which can include, mobile devices, smart devices, laptop computers etc.

Additional Examples and Embodiments

A control system can include a storage medium for maintaining a registration of users and their devices for analysis of the audio input. Such registration can include user profiles, which can include user data supplied by the users in reference to registering and setting-up an account. In an embodiment, the method and system which incorporates the present disclosure includes the control system (generally referred to as the back-end) in combination and cooperation with a front end of the method and system, which can be the application. In one example, the application is stored on a device, for example, a computer or device on location, and can access data and additional programs at a back end of the application, e.g., control system.

Referring to the figures, and for example FIG. 3, a system 500 includes a computer 572 which can be integral to or communicating with a device, and communicate with other computers such as computer 203 at the location 218, and/or the computer 222 of the service 220. Additionally, a computer 590 can electronically communicate, in all or in part, with the control system computer 572 as part of a control system 570. The control system 570 can include the computer 572 having a computer readable storage medium 573 which can store one or more programs 574, and a processor 575 for executing program instructions, and can also include control software 538 for managing the one or more programs. The control system 570 can include control software 578. The control system can also include a storage medium which can include registration and/or account data 582 and user profiles 583 of users or entities as part of user accounts 581. User accounts 581 can be stored on a storage medium 580 which is part of the control system 570. The user accounts 581 can include registrations and account data 582 and user profiles 583. The control system can also include the computer 572 having a computer readable storage medium 573 which can store programs or code embedded on the storage medium. The program code can be executed by a processor 575. The computer 572 can communicate with a database 576. The control system 570 can also include a database 576 for storing all or part of such data as described above, and other data.

The control system can also communicate with a computer system 590 which can include a learning engine/module 592 and a knowledge corpus or database 596. The learning engine 592 can be used to generate one or more computer models 593. The computer system 590 can also communicate with the computer 203 of the device 202 and can be remote from the user device. In another example, the computer system 590 can be all or part of the control system, or all or part of the device. The depiction of the computer system 590 as well as the other components of the system 500 are shown as one example according to the present disclosure. One or more computer systems can communicate with a communications network 219, e.g., the Internet.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, which may be shown, for example, in the example figures, for instance an application stored on a computer readable storage medium of a computer or device. The application is stored on the device or computer and can access data and additional programs at the back end of the application, for example, in the program(s) stored in the control system.

The program(s) can include, all or in part, a series of executable steps for implementing the method of the present disclosure. A program, incorporating the present method, can be all or in part stored in the computer readable storage medium on the control system or, in all or in part, on a computer or device. It is envisioned that the control system can not only store the profile of users, but in one embodiment, can interact with a website for viewing on a display of a device such as a mobile device, or in another example the Internet, and receive user input related to the method and system of the present disclosure. It is understood that embodiments shown in the figures depicts one or more profiles, however, the method can include multiple profiles, users, registrations, etc. It is envisioned that a plurality of users or a group of users can register and provide profiles using the control system for use according to the method and system of the present disclosure.

Still Further Embodiments and Examples

Account data, for instance, including profile data related to a user, and any data, personal or otherwise, can be collected and stored, for example, in a control system. It is understood that such data collection is done with the knowledge and consent of a user, and stored to preserve privacy, which is discussed in more detail below. Such data can include personal data, and data regarding personal items.

In one example a user can register and have an account with a user profile on a control system. For example, data can be collected using techniques as discussed above, for example, using cameras, and data can be uploaded to a user profile by the user. A user can include, for example, a corporate entity, or department of a business, or a homeowner, or any end user, a human operator, or a robotic device, or other personnel of a business.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

More Examples and Embodiments

Additionally, methods and systems according to embodiments of the present disclosure can be discussed in relation to a functional system(s) depicted by functional block diagrams. The methods and systems can include components and operations for embodiments according to the present disclosure, and is used herein for reference when describing the operational steps of the methods and systems of the present disclosure. Additionally, the functional system, according to an embodiment of the present disclosure, depicts functional operations indicative of the embodiments discussed herein.

The methods and systems of the present disclosure can include a series of operational blocks for implementing one or more embodiments according to the present disclosure. A method shown in the figures may be another example embodiment, which can include aspects/operations shown in another figure and discussed previously, but can be reintroduced in another example. Thus, operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

It is understood that the features shown in some of the figures, for example block diagrams, are functional representations of features of the present disclosure. Such features are shown in embodiments of the systems and methods of the present disclosure for illustrative purposes to clarify the functionality of features of the present disclosure.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants. It is also understood that machine and device are used interchangeable herein to refer to machine or devices in one or ecosystems or environments, which can include, for example and artificial intelligence (AI) environment.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is also understood that the one or more computers or computer systems shown in the figures can include all or part of a computing environment and its components shown in another figure, for example, the computing environment 1000 can be incorporated, in all or in part, in one or more computers or devices shown in other figures and described herein. In one example, the one or more computers can communicate with all or part of a computing environment and its components as a remote computer system to achieve computer functions described in the present disclosure.

More Additional Examples and Embodiments

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
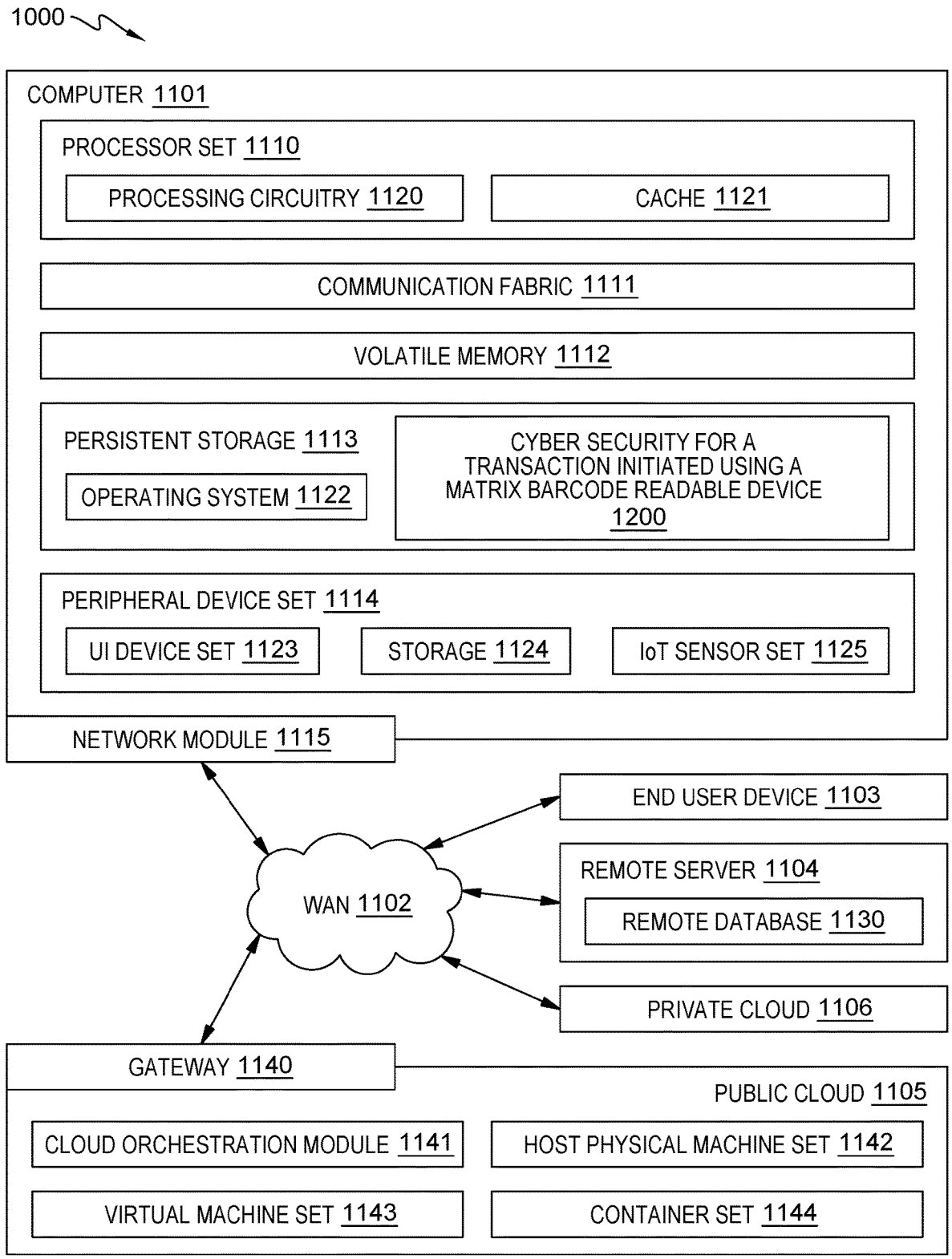
FIG. 5 is a schematic block diagram depicting a computer system according to an embodiment of the disclosure, which includes cloud computing components and functions, and which can cooperate with the systems and methods shown in the figures and described herein.

Referring to FIG. 5, a computing environment 1000 contains an example of an environment for the execution of at least some of the computer code involved in performing the inventive methods, such as provide cyber security for a transaction initiated using a matrix barcode readable by a device 1200. In addition to block 1200, computing environment 1000 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI), device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 7. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1200 in persistent storage 1113.

COMMUNICATION FABRIC 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

What is claimed is:

1. A computer implemented method for providing cybersecurity for a transaction initiated by a matrix barcode using a smart device, comprising:
    receiving, at a device having a computer, a reading of a matrix barcode on an item, the matrix barcode electronically pointing to a URL (Uniform Resource Locator) for a web-based resource accessible using the device via a computer network;
    determining, using the computer of the device or a service computer, information parameters about the matrix barcode;
    determining, as part of the information parameters, a location of the device using GPS (Global Positioning System);
    determining, using the computer of the device or the service computer, when the URL is identified as a registered service provider in a knowledge corpus communicating with the service computer;

determining, using the computer of the device or the service computer, when the location of the device is registered by the service computer; and validating the URL as registered, using the computer of the device or the service computer, when the URL is identified as corresponding to the registered service provider and based on the information parameters including when the location of the device is registered by the service computer.

2. The method of claim 1, further comprising:
in response to the validation of the URL as registered, sending a notification to the device for communication to a user that the URL is valid.

3. The method of claim 1, further including:
identifying the URL including the registered service provider providing the URL, and determining, using geopositioning, the location of the reading using the device, the location being an information parameter of the information parameters.

4. The method of claim 1, further comprising:
allowing or blocking access to the URL on the device based on the validation of the URL.

5. The method of claim 4, further comprising:
allowing access to the URL using the device when the URL is validated as registered.

6. The method of claim 1, further comprising:
determining an owner of the URL by determining ownership of a website of an entity corresponding to the URL.

7. The method of claim 1, further comprising:
using the knowledge corpus communicating with the computer of the device in the determining when the matrix barcode is identified as being a registered matrix barcode with the registered service provider in the knowledge corpus.

8. The method of claim 1, wherein the reading of the matrix barcode includes scanning the matrix barcode using an optical device of the device.

9. The method of claim 1, wherein the matrix barcode is a two-dimensional barcode.

10. The method of claim 1, further comprising: receiving service provider data from each of a plurality of service providers, the plurality of service providers providing URLs, respectively, for accessing websites electronically using the computer network by the device.

11. The method of claim 10, wherein the URLs point to websites corresponding to each of the plurality of service providers, respectively.

12. The method of claim 11, further comprising:
storing the service provider data in the knowledge corpus.

13. The method of claim 1, wherein the web-based resource is a website.

14. A system for providing cybersecurity for a transaction initiated by a matrix barcode using a smart device, which comprises:
a computer system comprising; a computer processor, a computer-readable storage medium, and program instructions stored on the computer-readable storage medium being executable by the processor, to cause the computer system to perform the following functions to;
receive, at a device having a computer, a reading of a matrix barcode on an item, the matrix barcode electronically pointing to a URL (Uniform Resource Locator) for a web-based resource accessible using the device via a computer network;

determine, using the computer of the device or a service computer, information parameters about the matrix barcode;

determine, as part of the information parameters, a location of the device using GPS (Global Positioning System);

determine, using the computer of the device or the service computer, when the URL is identified as a registered service provider in a knowledge corpus communicating with the service computer;

determine, using the computer of the device or the service computer, when the location of the device is registered by the service computer; and validate the URL as registered, using the computer of the device or the service computer, when the URL is identified as corresponding to the registered service provider and based on the information parameters which include when the location of the device is registered by the service computer.

15. The system of claim 14, further comprising:
in response to the validation of the URL as registered, sending a notification to the device for communication to a user that the URL is valid.

16. The system of claim 14, further including:
identifying the URL including the registered service provider providing the URL, and determining, using geopositioning, the location of the reading using the device, the location being an information parameter of the information parameters.

17. The system of claim 14, further comprising:
allowing or blocking access to the URL on the device based on the validation of the URL.

18. The system of claim 17, further comprising:
allowing access to the URL using the device when the URL is validated as registered.

19. The system of claim 14, further comprising:
determining an owner of the URL by determining ownership of a website of an entity corresponding to the URL.

20. A computer program product for providing cybersecurity for a transaction initiated by a matrix barcode using a smart device, the computer program product comprising a computer readable storage medium having program instructions embodied therewith, the program instructions executable by a computer to cause the computer to perform functions, by the computer, comprising the functions to;
receive, at a device having a computer, a reading of a matrix barcode on an item, the matrix barcode electronically pointing to a URL (Uniform Resource Locator) for a web-based resource accessible using the device via a computer network;

determine, using the computer of the device or a service computer, information parameters about the matrix barcode;

determine, as part of the information parameters, a location of the device using GPS (Global Positioning System);

determine, using the computer of the device or the service computer, when the URL is identified as a registered service provider in a knowledge corpus communicating with the service computer;

determine, using the computer of the device or the service computer, when the location of the device is registered by the service computer; and validate the URL as registered, using the computer of the device or the service computer, when the URL is identified as corresponding to the registered service provider and based on the information parameters which include when the location of the device is registered by the service computer.

* * * * *